(12) United States Patent
Chen (10) Patent No.: US 6,663,493 B1
(45) Date of Patent: Dec. 16, 2003

(54) COUPLING DEVICE

(76) Inventor: Hsi-Tsai Chen, No. 36, Pao-Shan 6th St., Nan-Tun Dist., Taichung City (TW)

( * ) Notice: Subject to any disclaimer, the term of this patent is extended or adjusted under 35 U.S.C. 154(b) by 0 days.

(21) Appl. No.: 10/242,167

(22) Filed: Sep. 11, 2002

(30) Foreign Application Priority Data

Jul. 12, 2002 (TW) ........................................ 91210644 U (51) Int. Cl.⁷ ................................................ F16D 3/24
(52) U.S. Cl. .................... 464/152; 464/137; 464/106
(58) Field of Search ................................ 464/106, 137, 464/112, 125, 150, 152, 159, 185, 906, 158, 905; 242/598.2, 599.4, 599.1, 599.3

(56) References Cited

U.S. PATENT DOCUMENTS

| | | | | |
|---|---|---|---|---|
| 3,199,311 A | * | 8/1965 | Hill ............................ | 464/159 |
| 3,246,858 A | * | 4/1966 | Alexeff ...................... | 242/598.4 |
| 3,729,953 A | * | 5/1973 | Wanzer ...................... | 464/152 |
| 4,344,304 A | * | 8/1982 | Eiche ......................... | 464/85 |
| 4,551,117 A | * | 11/1985 | Kunz .......................... | 464/106 |
| 4,681,478 A | * | 7/1987 | Kunz .......................... | 403/341 |
| 4,758,113 A | * | 7/1988 | Kunz .......................... | 403/341 |
| 4,838,725 A | * | 6/1989 | Fazis ......................... | 403/322.3 |
| 4,848,934 A | * | 7/1989 | Blakely et al. .............. | 384/206 |
| 4,887,926 A | * | 12/1989 | Kunz .......................... | 403/27 |
| 5,295,913 A | * | 3/1994 | Pyka et al. ................. | 464/106 |

* cited by examiner

Primary Examiner—Lynne H. Browne
Assistant Examiner—Kenn Thompson
(74) Attorney, Agent, or Firm—Christensen O'Connor Johnson Kindness PLLC (57) ABSTRACT

A coupling device includes a transmission member and a work shaft. The transmission member includes a cylindrical rod to be coupled to a rotary drive unit, and a curved coupling flange projecting axially relative to one end of the cylindrical rod and formed with a plurality of engaging protrusions. The work shaft has a coupling end portion provided with a tubular sleeve that is formed with engaging grooves. The coupling end portion is disposed on the coupling flange to enable engagement between the engaging grooves and the engaging protrusions in order to permit transmission of rotation of the transmission member to the work shaft.

4 Claims, 8 Drawing Sheets

COUPLING DEVICE

CROSS-REFERENCE TO RELATED APPLICATION

This application claims priority of Taiwanese Application No. 091210644, filed on Jul. 12, 2002.

BACKGROUND OF THE INVENTION

1. Field of the Invention

The present invention relates to a coupling device to be coupled to a rotary drive unit for enabling transmission of rotation from the drive unit, more particularly to a coupling device with an enhanced transmission efficiency and a longer service life.

2. Description of the Related Art

Figure 1:
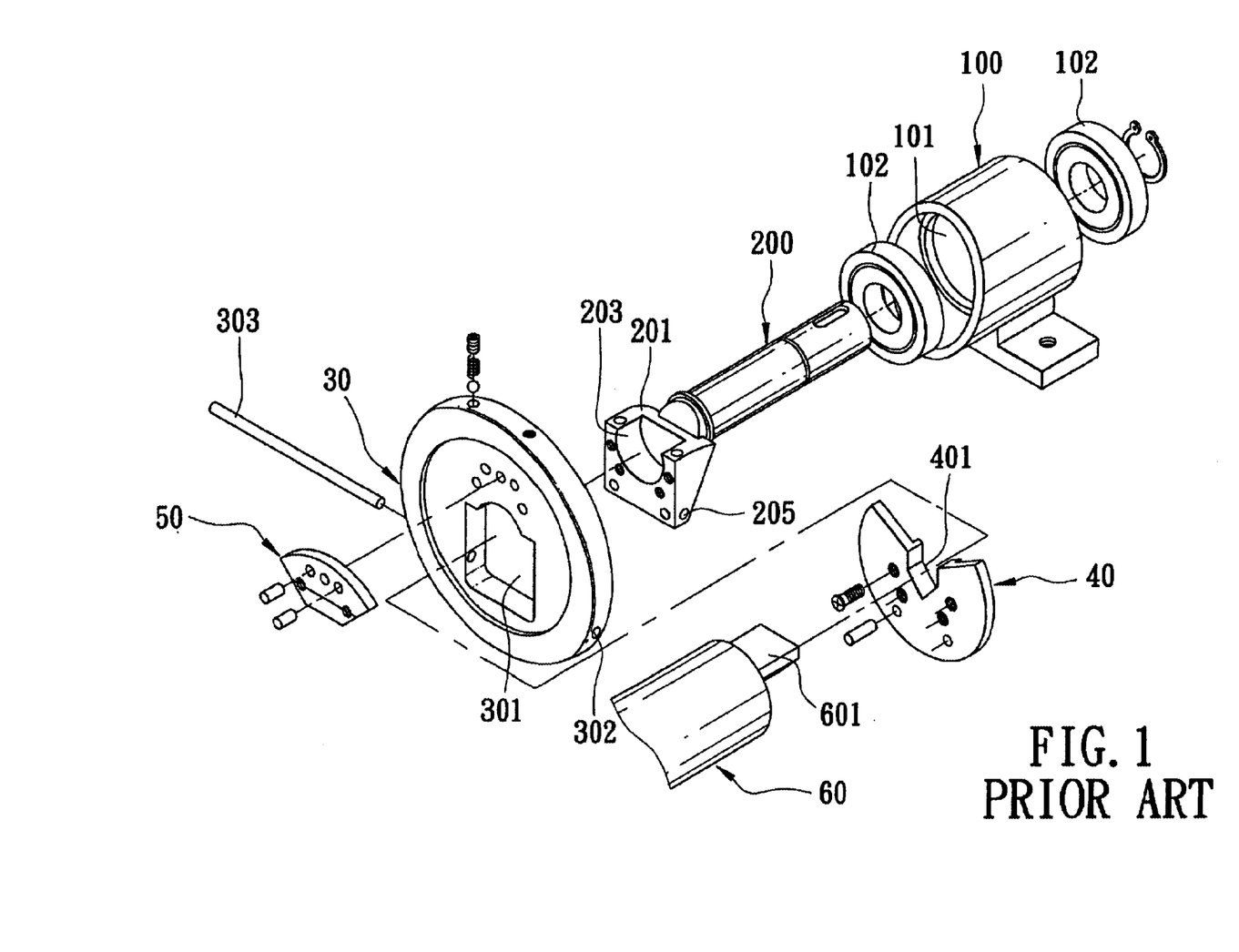
FIG. 1 is an exploded perspective view of a conventional coupling device.
Figure 2:
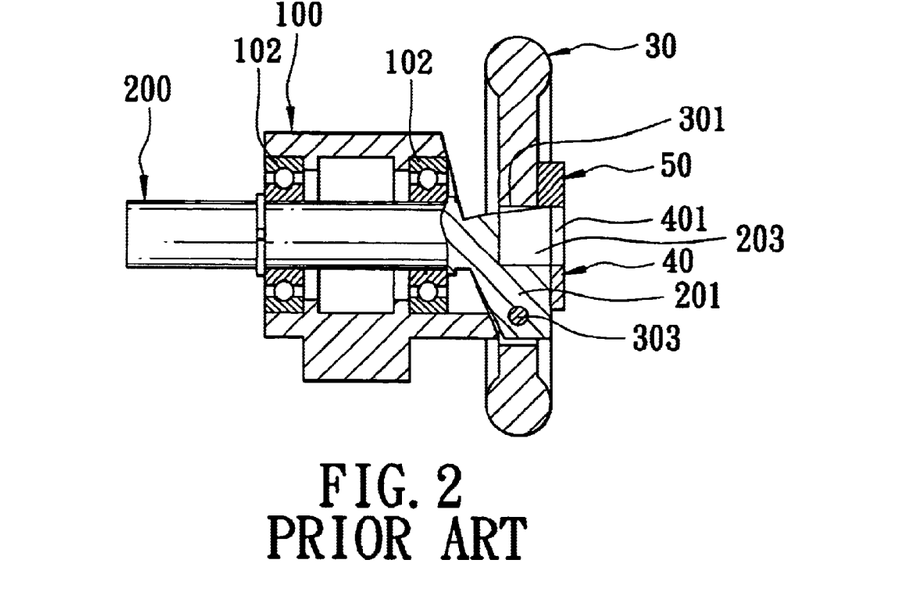
FIG. 2 is a sectional view of the conventional coupling device, where a clutch wheel is shown to be disposed in a first position.

A coupling device is a device that couples a work shaft to a rotary-drive unit so as to enable the work shaft to rotate with the drive unit. FIG. 1 illustrates a conventional coupling device which includes a bearing seat 100, a transmission shaft 200, a clutch wheel 30, first and second coupling plates 50, 40, and a work shaft 60. The seat 100 is stationary, and includes a tubular part, that defines an axial hole 101. Two bearing rings 102 are mounted in the axial hole 101. The transmission shaft 200 has a rear end extending through the axial hole 101 and the bearing rings 102 and to be coupled to a rotary drive unit (not shown), and a front end provided with a mounting block 201 which is formed with a semi-circular cavity 203 that opens upwardly and forwardly. The mounting block 201 has a pivot hole 205 formed through a lower end thereof and extending transverse to an axis of the transmission shaft 200. The clutch wheel 30 is formed with a central hole 301 which has a shape generally corresponding to that of the mounting block 201. The mounting block 201 extends into the central hole 301 so as to be coupled co-rotatably with the clutch wheel 30. The clutch wheel 30 has a pivot hole 302 formed therethrough and aligned with the pivot hole 205 in the mounting block 201. A pivot axle 303 extends through the pivot holes 302, 205 in the clutch wheel 30 and the mounting block 201 for mounting the clutch wheel 30 pivotally on the mounting block 201. The first coupling plate 50 is fan-shaped, and is fastened to a front side surface of the clutch wheel 30 adjacent to the central hole 301. The second coupling plate 40 is disposed on a front side of the clutch wheel 30, and is fastened to a front end wall of the mounting block 201. When the clutch wheel 30 is in a first position in which the clutch wheel 30 is perpendicular to an axis of the transmission shaft 200, as shown in FIG. 2, the first and second coupling plates 50, 40 cooperatively form a circular disk, and cooperatively confine a polygonal coupling hole 401 registered with the central hole 301 in the clutch wheel 30 and the cavity 203 in the mounting block 201. The work shaft 60 has a coupling end portion 601 with a polygonal cross-section corresponding to that of the coupling hole 401.

Figure 3:
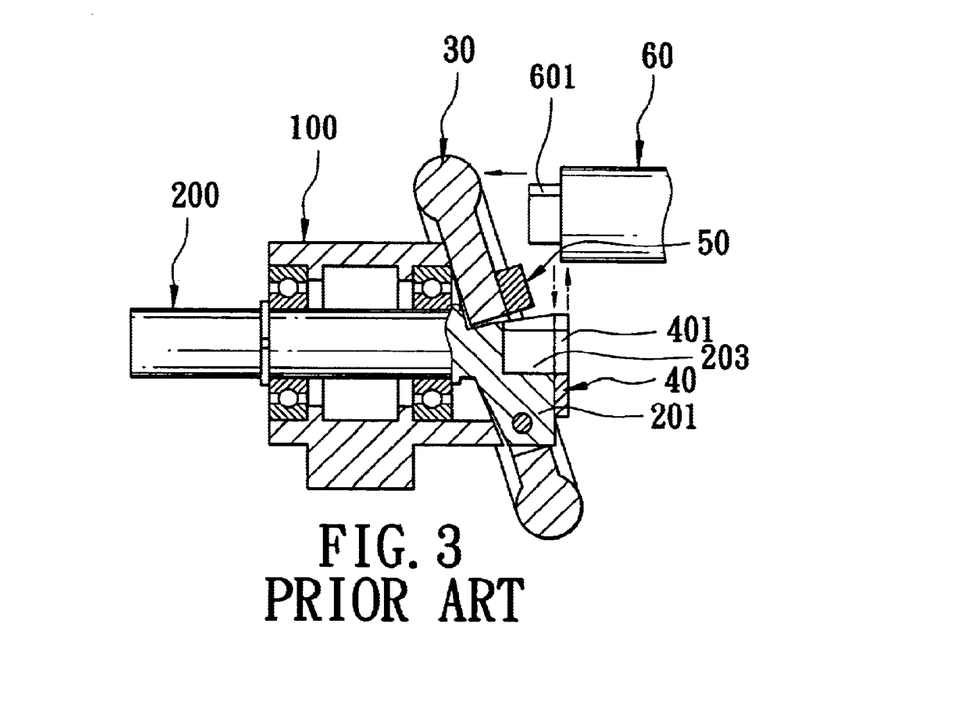
FIG. 3 is another sectional view of the conventional coupling device, where the clutch wheel is shown to be disposed in a second position.

In use, the clutch wheel 30 together with the first coupling plate 50 mounted thereon are moved pivotally relative to the mounting block 201 to a second position shown in FIG. 3, in which the clutch wheel 30 extends along another plane that is inclined relative to the axis of the transmission shaft 200. In this position, the first coupling plate 50 is spaced apart from the second coupling plate 40 to permit access to the coupling hole 401, and a top opening of the cavity 203 in the mounting block 201 is exposed at this time. The coupling end portion 601 of the work shaft 60 can thus be extended into the coupling hole 401 and into the cavity 203 from above. The clutch wheel 30 is then moved pivotally back to the first position shown in FIG. 2 such that the coupling end portion 601 is received in the coupling hole 401 and is coupled co-rotatably with the first and second coupling plates 50, 40, the clutch wheel 30 and the mounting block 201. The work shaft 60 is thus coupled to the transmission shaft 200 so as to permit transmission of rotation from the rotary drive unit (not shown) to the work shaft 60.

It is noted that connection between the work shaft 60 and the transmission shaft 200 is achieved by the coupling between the polygonal coupling end portion 601 of the work shaft 60 and the polygonal coupling hole 401 confined by the first and second coupling plates 50, 40. High precision is thus required when forming the polygonal coupling end portion 601 of the work shaft 60 and the first and second coupling plates 50, 40. This unavoidably increases the manufacturing cost. Moreover, slight deviations in the precision of the size and shape of the polygonal coupling end portion 601 and the polygonal coupling hole 401 can cause the polygonal coupling end portion 601 to collide with the first and second coupling plates 50, 40 during rotation. This results in noise and in wear and tear of these components to thereby reduce the service life of the conventional coupling device.

SUMMARY OF THE INVENTION

Therefore, the main object of the present invention is to provide a coupling device with enhanced transmission efficiency and a longer service life.

Accordingly, the coupling device of the present invention includes a transmission member and a work shaft. The transmission member includes a cylindrical rod with an axis, a rear end adapted to be coupled to a rotary drive unit so as to be rotated by the drive unit, a front end, and a circumferential outer surface extending between the front and rear ends. The transmission member further includes a curved coupling flange which has a cross-section in the form of a circular sector and which extends circumferentially and co-axially along the outer surface of the cylindrical rod. The coupling flange is fixed to the outer surface of the cylindrical rod and projects forwardly relative to the front end of the cylindrical rod. The coupling flange has a concave face confronting the axis of the cylindrical rod and formed with a plurality of engaging protrusions, and a convex face opposite to the concave face. The work shaft includes a main body which extends along the axis of the cylindrical rod of the transmission member and which has a spherical end, and a tubular sleeve sleeved on the spherical end and co-rotatable with the spherical end. The tubular sleeve cooperates with the spherical end to form a coupling end portion of the work shaft. The tubular sleeve is formed with a plurality of engaging grooves which are angularly displaced from one another with respect to the axis of the cylindrical rod of the transmission member. The coupling end portion is disposed on the concave face of the coupling flange so as to enable engagement between the engaging grooves and the engaging protrusions in order to permit transmission of rotation of the transmission member to the work shaft.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 4:
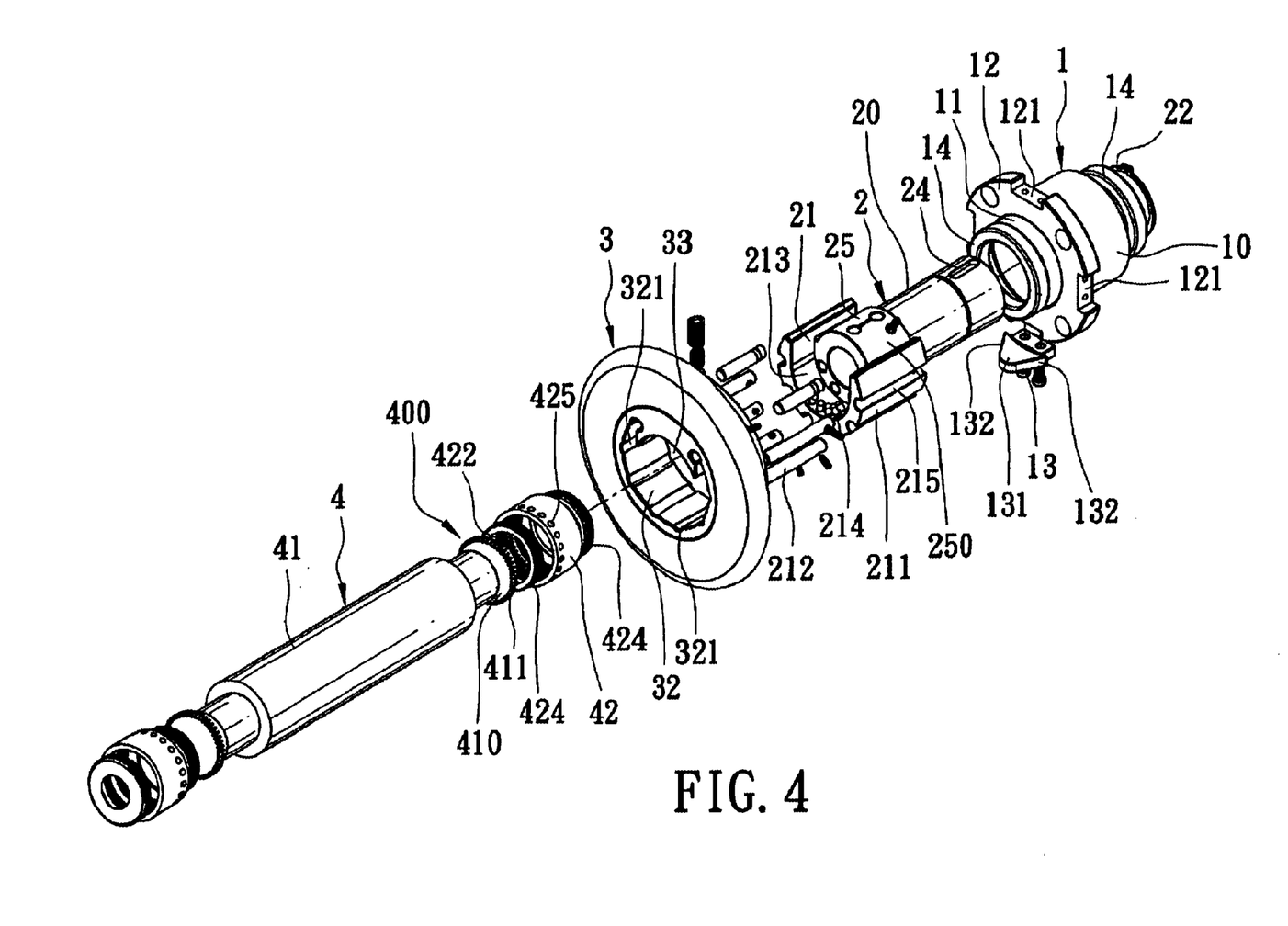
FIG. 4 is an exploded perspective view of a preferred embodiment of a coupling device of the present invention.
Figure 5:
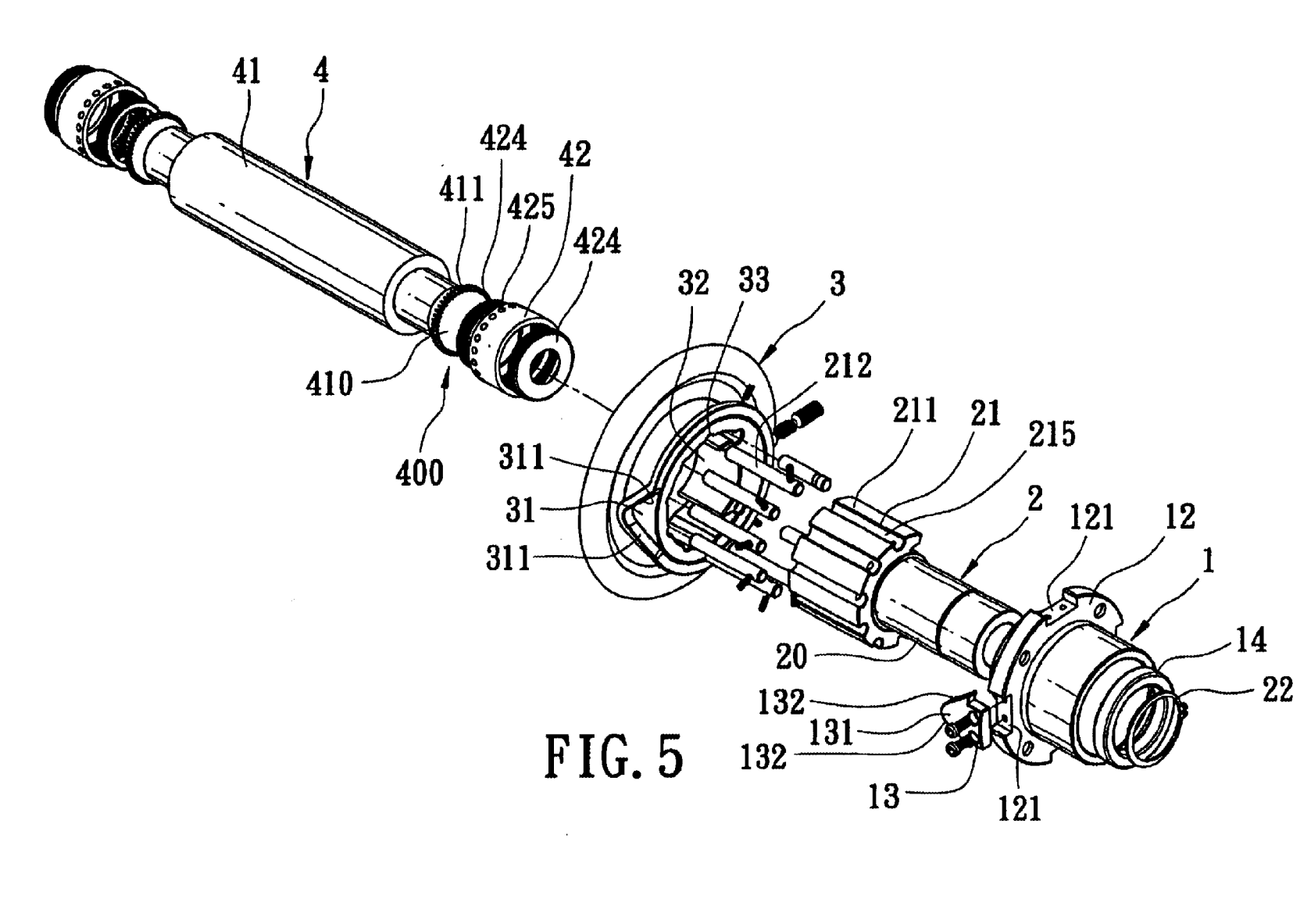
FIG. 5 is another exploded perspective view of the coupling device of the preferred embodiment, viewed from a different angle.
Figure 6:
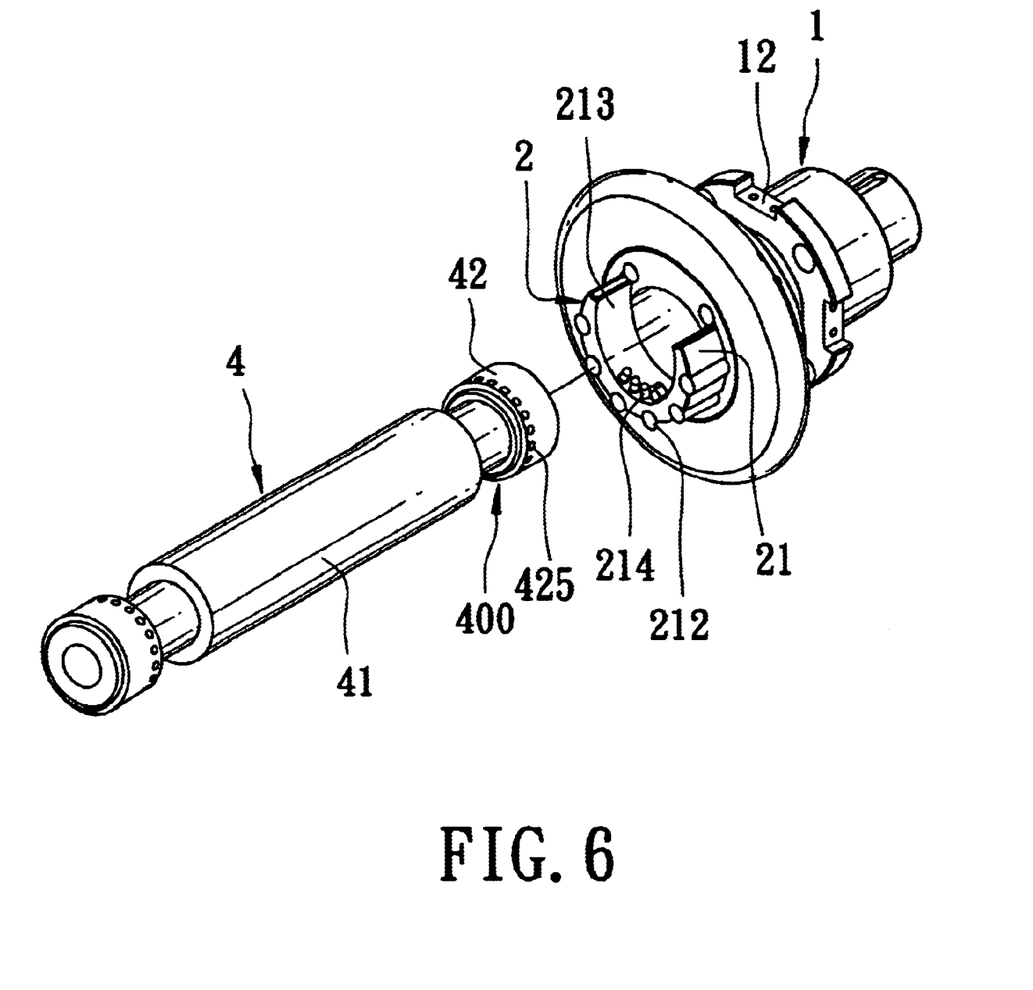
FIG. 6 is a partly exploded perspective view of the coupling device of the preferred embodiment.

Referring to FIGS. 4, 5 and 6, the preferred embodiment of the coupling device according to the present invention is shown to include a bearing seat 1, a transmission member 2, a slide seat 3, and a work shaft 4.

The bearing seat 1 includes a tubular body 10 formed with an axial hole 11, an annular disk 12 formed around a front end of the tubular body 10, a push plate 13 fastened to the annular disk 12, and a bearing unit including a pair of ball bearings 14 mounted in the tubular body 10. The annular disk 12 has a peripheral edge formed with four angularly displaced notches 121, one of which is fastened with the push plate 13. The push plate 13 has a triangular plate portion 131 with a pair of bevel walls 132. The triangular plate portion 131 of the push plate 13 projects relative to the annular disk 12 and the tubular body 10 in a forward and axial direction.

The transmission member 2 includes a cylindrical rod 20 with a rear end 24 which extends through the bearings 14 and the tubular body 10 of the bearing seat 1 so as to be supported rotatably by the bearing seat 1, and a front end 25 formed with a curved coupling-flange 21. The rear end 24 engages a retaining ring 22, and is adapted to be coupled to a rotary drive unit (not shown) so as to be rotated by the drive unit. The coupling flange 21 has a cross-section in the form of a circular sector, and extends circumferentially and co-axially along a circumferential outer surface 250 of the cylindrical rod 20. The coupling flange 21 projects relative to the front end 25 of the cylindrical rod 20. In the present embodiment, the coupling flange 21 is integrally formed with the cylindrical rod 20. The coupling flange 21 has a concave face 213 confronting an axis of the cylindrical rod 20, and a convex face 211 opposite to the concave face 213. The concave face 213 is formed with a plurality of engaging protrusions 214 which are angularly displaced from one another with respect to the axis of the cylindrical rod 20. The convex face 211 is formed with a plurality of axially extending and angularly displaced grooves 215, each of which has a transmission cylinder 212 received therein. The transmission cylinders 212 are fastened to the coupling flange 21 and project relative to the convex face 211 in radial directions.

The slide seat 3 is generally annular in shape, and has an inner wall surface 32 which defines a central hole 33 that permits extension of the coupling flange 21 and the cylindrical rod 20 therethrough. The inner wall surface 32 is formed with a plurality of axially extending receiving grooves 321 for receiving the transmission cylinders 212, respectively. The slide seat 3 further has a rear side formed with a triangular notch 31 (see FIG. 5), which has a size and shape corresponding to those of the triangular plate portion 131 of the push plate 13 for receiving the push plate 13. The notch 31 is defined by a pair of inclined side walls 311.

The work shaft 4 includes a cylindrical main body 41 which has a spherical end 410, a tubular sleeve 42 sleeved on the spherical end 410, and a pair of packing rings 424 sleeved on the spherical end 410 and engaging threadedly an inner surface of the tubular sleeve 42 at two opposite ends of the tubular sleeve 42. The spherical end 410 has a waist portion with a largest diameter and formed with a series of first teeth 411 that are arranged around the waist portion. The inner surface of the tubular sleeve 42 is formed with a series of second teeth 422 that are arranged annularly for meshing with the first teeth 411 so as to enable co-rotation of the tubular sleeve 42 with the spherical end 410 of the cylindrical main body 41. The tubular sleeve 42 further has an outer surface formed with a plurality of radial engaging grooves 425 for engaging the engaging protrusions 214 on the coupling flange 21. The tubular sleeve 42, the packing rings 424 and the spherical end 410 of the cylindrical main body 41 cooperatively constitute a coupling end portion 400 of the work shaft 4.

Figure 7:
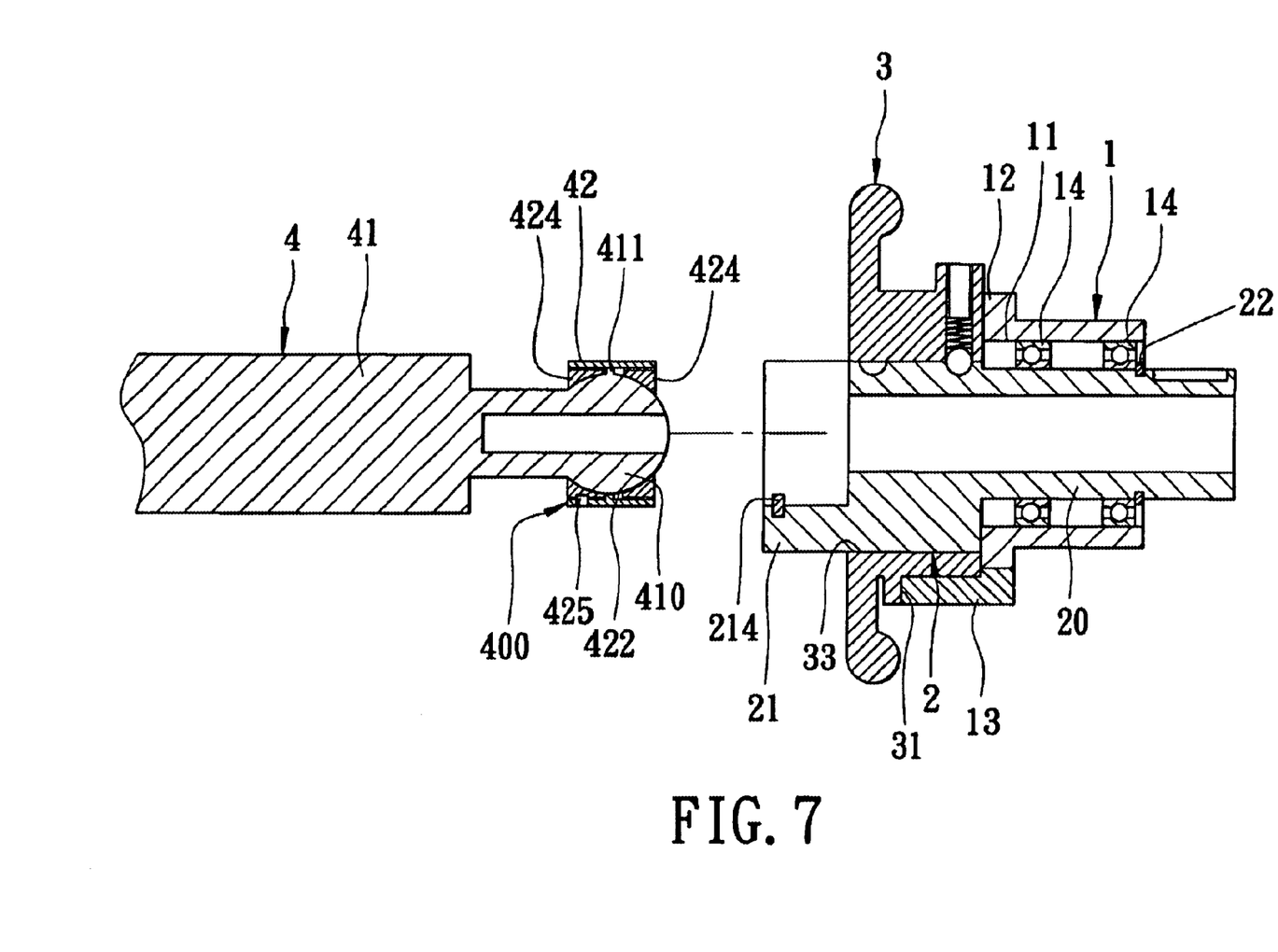
FIG. 7 is a fragmentary partly exploded sectional view of the preferred embodiment.

Referring to FIGS. 4, 6 and 7, during assembly, the rear end 24 of the cylindrical rod 20 of the transmission member 2 is extended through the bearings 14 of the bearing seat 1 so as to be supported rotatably by the bearing seat 1, and is coupled to the rotary drive unit (not shown). The slide seat 3 is sleeved on the transmission member 2 such that the coupling flange 21 extends fittingly and slidably through the central hole 33 of the slide seat 3 and projects forwardly relative to the slide seat 3. The transmission cylinders 212, which have been initially fastened to the coupling flange 21, are extended slidably and respectively into the receiving grooves 321 at this time. Then, the work shaft 4 is disposed to extend along the axis of the cylindrical rod 20 of the transmission member 2, and is assembled to the transmission member 2 by disposing the coupling end portion 400 of the work shaft 4 on the coupling flange 21 so as to enable engagement between the engaging grooves 425 in the tubular sleeve 42 and the engaging protrusions 214 on the coupling flange 21. The work shaft 4 is thus coupled to the transmission member 2 in a co-rotatable manner.

Prior to operation of the coupling device, the slide seat 3 is initially disposed in a first position shown in FIG. 7, in which the coupling flange 21 projects forwardly from the central hole 33 of the slide seat 3 and in which the push plate 13 on the bearing seat 1 extends into the notch 31 of the slide seat 3 such that the bevel walls 132 of the push plate 13 confront and abut against the inclined side walls 311 of the notch 31.

Figure 8:
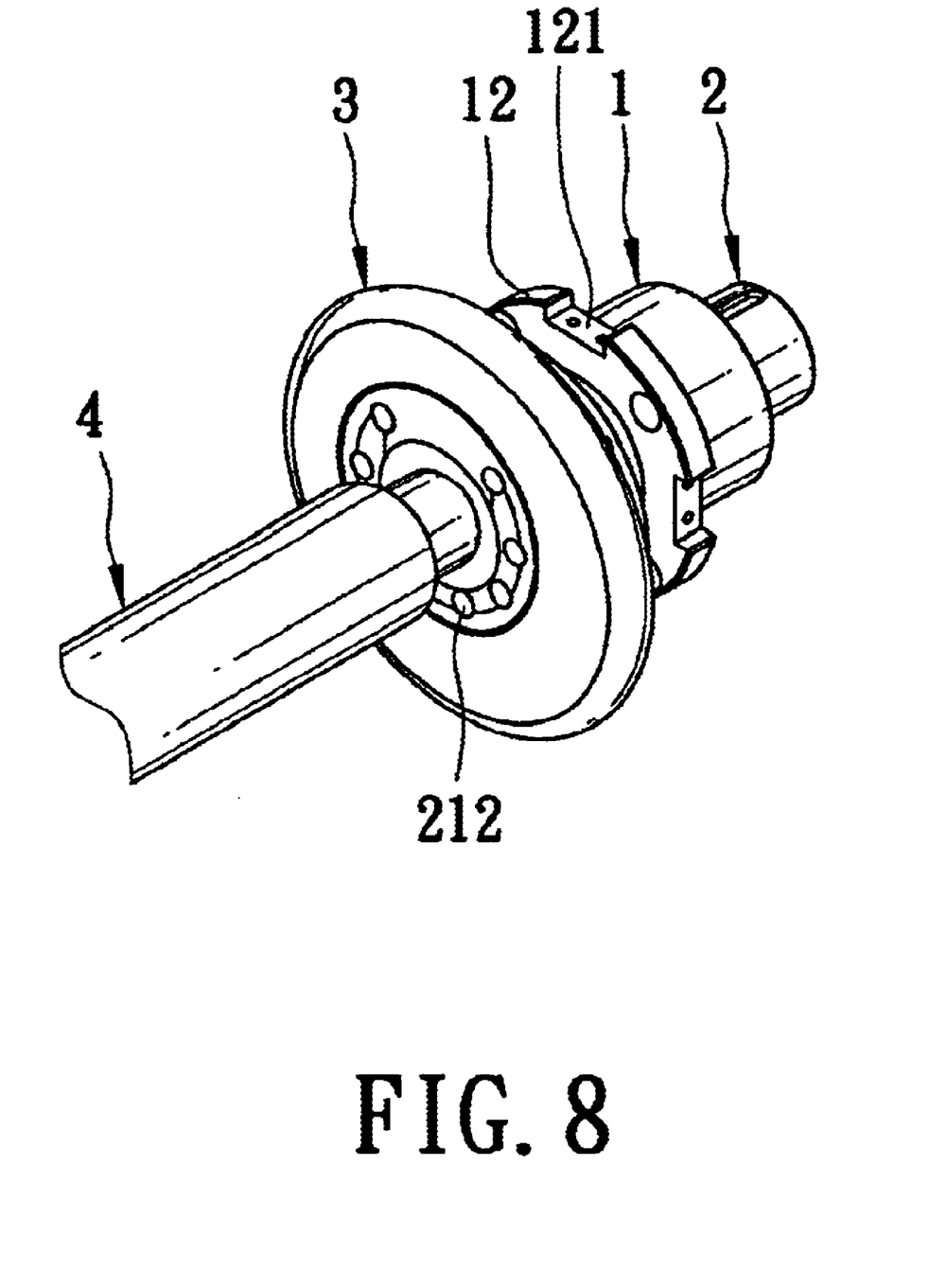
FIG. 8 is a fragmentary assembled perspective view of the preferred embodiment.
Figure 9:
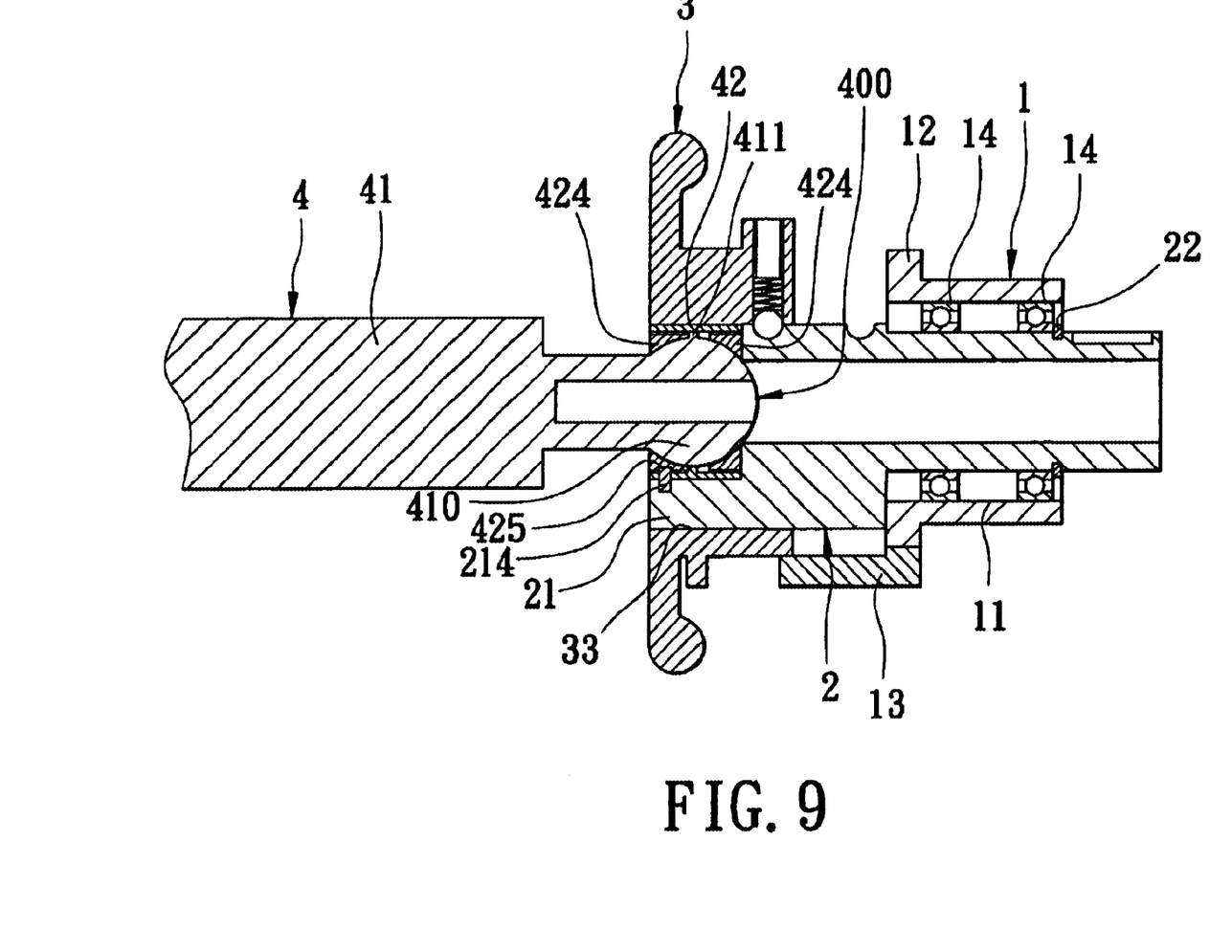
FIG. 9 is a fragmentary schematic sectional view of the preferred embodiment.

When the rotary drive unit is activated, the transmission member 2 is driven by the drive unit and is thereby rotated relative to the bearing seat 1. Rotation of the transmission member 2 results in co-rotation of the slide seat 3. At this time, since the bearing seat 1 is stationary and since the push plate 13 is secured to the bearing seat 1, one of the inclined side walls 311 (see FIG. 5) of the notch 31 slides along, a corresponding one of the bevel walls 132 of the push plate 13. The slide seat 3 is thus pushed by the push plate 13 in a direction away from the bearing seat 1 to slide along the axis of the cylindrical rod 20 of the transmission member 2 for moving to a second position shown in FIGS. 8 and 9. In the second position, the push plate 13 is disengaged from the notch 31 to permit rotation of the slide seat 3 with the transmission member 2 relative to the bearing seat 1. Under this state, the coupling end portion 400 of the work shaft 4 and the coupling flange 21 extend into the central hole 33 of the slide seat 3, and are surrounded by the slide seat 3.

Accordingly, in the coupling device of the present invention, the work shaft 4, the slide seat 3, and the transmission member 2 are coupled co-axially to one another. The presence of the transmission cylinders 212 increases the contact area between the transmission member 2 and the slide seat 3, and helps to transmit the torque from the transmission member 2 to the slide seat 3. Moreover, the spherical end 410 of the cylindrical main body 41 of the work shaft 4 helps to prevent significant collisions among the work shaft 4, the slide seat 3 and the transmission member 2 to reduce the noise generated during operation and wearing of the components, thus prolonging the service life of the coupling device.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A coupling device comprising:
    a transmission member including a cylindrical rod with an axis, a rear end adapted to be coupled to a rotary drive unit so as to be rotated by the drive unit, a front end, and a circumferential outer surface extending between said front and rear ends, said transmission member further including a curved coupling flange which has a cross-section in the form of a circular sector and which extends circumferentially and co-axially along said outer surface of said cylindrical rod, said coupling flange being fixed to said outer surface of said cylindrical rod and projecting forwardly relative to said front end of said cylindrical rod, said coupling flange having a concave face confronting said axis of said cylindrical rod and formed with a plurality of engaging protrusions, and a convex face opposite to said concave face; and
    a work shaft including a main body which extends along said axis of said cylindrical rod of said transmission member and which has a spherical end, and a tubular sleeve sleeved on said spherical end and co-rotatable with said spherical end, said tubular sleeve cooperating with said spherical end to form a coupling end portion of said work shaft, said tubular sleeve being formed with a plurality of engaging grooves which are angularly displaced from one another with respect to said axis of said cylindrical rod of said transmission member, said coupling end portion being disposed on said concave face of said coupling flange so as to enable engagement between said engaging grooves and said engaging protrusions in order to permit transmission of rotation of said transmission member to said work shaft, wherein said transmission member further includes a plurality of transmission cylinders secured to said convex face of said coupling flange and projecting in radial directions relative to said convex face of said coupling flange, said transmission cylinders extending axially along said convex face of said coupling flange and being angularly displaced from one another, said coupling device further comprising an annular slide seat which has an inner wall surface that defines a central hole, said transmission member extending slidably into said central hole and being coupled with said slide seat such that said slide seat is slidable relative to said transmission member and is co-rotatable with said transmission member, said inner wall surface of said slide seat being formed with a plurality of angularly displaced and axially extending receiving grooves for receiving said transmission cylinders on said convex face of said coupling flange.

2. The coupling device as claimed in claim 1, further comprising a stationary bearing seat having a tubular body which has an inner surface that is provided with a bearing unit, said rear end of said cylindrical rod of said transmission member extending rotatably through said bearing unit.

3. The coupling device as claimed in claim 2, wherein said bearing seat is provided with a push plate which projects in an axial direction of said cylindrical rod toward said slide seat, said push plate having a triangular plate portion with a pair of bevel walls, said slide seat being formed with a triangular notch for receiving said push plate, said triangular notch being defined by a pair of inclined side walls, said slide seat being disposed in a first position prior to operation of said transmission member, said push plate extending into said notch in said slide seat such that said bevel walls of said push plate confront said inclined side walls of said notch respectively when said slide seat is in the first position, one of said inclined side walls of said notch sliding along a corresponding one of said bevel walls of said push plate when said transmission member is operated to cause co-rotation of said slide seat with said transmission member, thereby enabling said slide seat to be pushed in a direction away from said bearing seat and to slide axially along said axis of said cylindrical rod of said transmission member for moving to a second position, in which said push plate is disengaged form said notch to permit rotation of said slide seat with said transmission member relative to said bearing seat, said coupling flange of said transmission member and said coupling end portion of said work shaft being extended into said central hole of said slide seat and being surrounded by said slide seat when said slide seat is moved to the second position.

4. The coupling device as claimed in claim 3, wherein said bearing seat further includes an annular disk formed around said tubular body, said push plate being fastened to said annular disk.

* * * * *